United States Patent [19]

Nyberg et al.

[11] Patent Number: 5,507,869
[45] Date of Patent: Apr. 16, 1996

[54] DEVICE FOR APPLYING AN INSULATING LAYER TO A SURFACE OF AN OBJECT

[75] Inventors: Curt E. T. Nyberg, Tyresö; Henrik E. Troberg, Tumba, both of Sweden

[73] Assignee: Aktiebolaget Electrolux, Stockholm, Sweden

[21] Appl. No.: 980,801

[22] PCT Filed: Jun. 24, 1992

[86] PCT No.: PCT/SE92/00466

§ 371 Date: Feb. 26, 1993

§ 102(e) Date: Feb. 26, 1993

[87] PCT Pub. No.: WO93/01444

PCT Pub. Date: Jan. 21, 1993

[30] Foreign Application Priority Data

Jul. 2, 1991 [SE] Sweden ................................ 9102067

[51] Int. Cl.⁶ ..................................................... B05B 7/00
[52] U.S. Cl. ............................ 118/308; 118/642; 118/58; 118/503; 239/403; 239/424.5; 239/597
[58] Field of Search ............................ 427/196, 203–206, 427/389.8, 407.3, 426, 421, 331; 118/303, 308, 320, 634, 642, 58, 503; 239/597, 530, 424.5, 403

[56] References Cited

U.S. PATENT DOCUMENTS

| | | | |
|---|---|---|---|
| 1,702,043 | 2/1929 | Elliott | 427/426 |
| 1,718,507 | 6/1929 | Wenzel et al. | 427/196 |
| 2,578,412 | 12/1951 | Fisher | 239/424.5 |
| 3,871,583 | 3/1975 | Kellert | 239/403 |
| 4,044,717 | 8/1977 | Provost | 118/629 |
| 4,219,156 | 8/1980 | Schwaerzler | 239/265.35 |
| 4,317,851 | 3/1982 | Neser | 427/426 |
| 4,504,602 | 3/1985 | O'Connell et al. | 521/78 |
| 4,542,040 | 9/1985 | Nowak | 427/426 |
| 4,673,594 | 6/1987 | Smith | 427/426 |
| 4,683,151 | 7/1987 | Hamaguchi et al. | 427/397.8 |
| 4,695,338 | 9/1987 | Cousin et al. | 156/71 |
| 4,696,847 | 9/1987 | Cousin et al. | |
| 4,809,640 | 3/1989 | Pilley et al. | 118/257 |
| 4,814,201 | 3/1989 | Smith | 427/426 |
| 4,852,392 | 8/1989 | Evans | 73/41.2 |
| 4,968,556 | 11/1990 | Jain | 428/290 |
| 4,992,227 | 2/1991 | Brossy | 264/112 |
| 5,064,689 | 11/1991 | Young, Sr. et al. | 264/121 |

FOREIGN PATENT DOCUMENTS

| | | |
|---|---|---|
| 0083960 | 7/1983 | European Pat. Off. . |
| 0375486 | 6/1990 | European Pat. Off. . |
| 2815616 | 10/1979 | Germany . |
| 59-205480 | 11/1984 | Japan .................................. 427/203 |

*Primary Examiner*—Laura Collins
*Attorney, Agent, or Firm*—Pearne, Gordon, McCoy & Granger

[57] ABSTRACT

According to a method for applying an insulating layer to a surface fibers, of an inorganic material an sprayed onto the surface under simultaneous wetting of the fibers with water and/or a binder so that the fibers stick to the surface whereafter the layer is formed and dryed/hardened. Prior to or after the drying/hardening a binder can be sprayed to the surface for the purpose of achieving a dustless and mechanically resistant surface layer. A device for applying of an insulation to a surface of an object (10), making use of the method, comprises a store (41) of fibers of an inorganic material, a conduit (20) for the transfer fibers from the store (41) to a spray nozzle (21) and device for generating an air flow in the conduit (20) directed towards the nozzle (21). Further, the device includes a first ejector (22) provided at the end of the conduit facing the store (41) for introducing air jets into the conduit (20) in the direction of the fiber stream but at an inclination with respect to the stream, a second ejector (23) disposed at the end of the conduit facing the spray nozzle (21) for the introduction of air jets directed so as to bring the fiber stream into rotation, and a device (24) disposed adjacent to the spray nozzle (21) for introducing into the fiber stream, but outside of the spray nozzle, of liquid jets in the direction of the fiber stream but forming an angle with the stream, the liquid jets comprising a mixture of water and a binder.

17 Claims, 3 Drawing Sheets

DEVICE FOR APPLYING AN INSULATING LAYER TO A SURFACE OF AN OBJECT

BACKGROUND OF THE INVENTION

The present invention is directed to a method and a device for applying an insulating layer to a surface of an object.

In connection with oven cavities used in ranges or built-in ovens the oven, cavity has to be provided with a heat cavity insulation surrounding said cavity which prevents the heat energy supplied to the oven from unnecessarily leaking out to the environment and, at the same time, assures that surrounding range or oven parts not reach high temperatures at which there is a risk of fire or other damage.

Traditionally, a heat insulation of the kind referred to has the shape of mats and plates of glass-wool or mineral wool cut out and secured to the outer surfaces of the oven cavity by means of steel straps or the like or, at the rear side of the oven, by means of an adhesive. The most common insulating material is glass-wool which consists of glass fibres kept together by a phenol-based binder. In manufacturing ranges or ovens in the factory these mats or plates of glass-fibre have to be cut out and otherwise handled in a way creating glass fibre dust in large quantities. This dust creation disadvantage is made worse by the use of tools driven by compressed air In addition, the manual handling itself of the glass-wool mats and plates involves the risk of skin irritations, such as eczema, to develop. Another drawback is the creation of noxious gases emitted from the phenol containing binder of the heat insulation when the finished range or oven is used.

Accordingly, it is an object of the invention to make possible the application of an insulation of the kind referred to in such a way as to remedy the drawbacks indicated.

SUMMARY OF THE INVENTION

In accordance with the present invention, fibres of inorganic material are sprayed on a surface to be insulated. As the fibres are sprayed by means of an airstream, the fibres are wetted by a separate spray of water with a binder material. The device for applying the fibres by spraying includes a source for the fibres, a spray assembly having a conduit with first and second ejector means at respective ends of the conduit, and spray nozzles adjacent to the outlet of the conduit for applying the mixture of water and binder to the sprayed fibres.

BRIEF DESCRIPTION OF THE DRAWINGS

The invention will now be described more in detail in connection with an embodiment with reference to the enclosed drawings in which.

DETAILED DESCRIPTION OF THE PREFERRED EMBODIMENT

Figure 1:
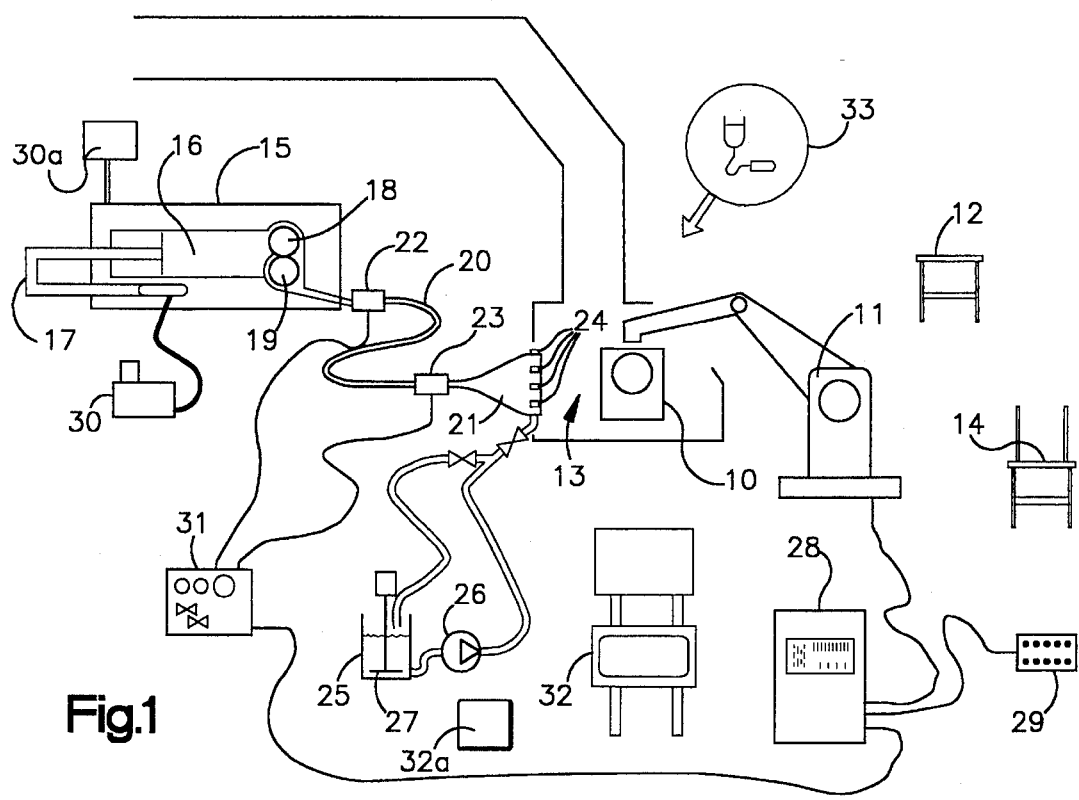
FIG. 1 schematically shows a production facility for application of an insulating layer according to the invention onto the outer surfaces of an oven cavity.

The embodiment to be described refers to the application of a heat insulating layer to the outside of an oven cavity intended to be mounted in a domestic range. Alternatively, the oven cavity may constitute a separate unit in the shape of a built-in oven. Suitably, the application of the insulating layer is carried out in an automatic work station of a suitable design. In FIG. 1 the design of such work station is schematically shown.

In the embodiment, a method is being used according to which fibres of a inorganic heat insulating material is sprayed onto the external surface of the oven cavity under simultaneous wetting of the fibres with an aqueous binder causing the fibres to stick to the cavity. The fibres are glass-wool fibres and the binder is of the silicate type and in the example described the binder is EKA Thorsil, having 14 percentage by weight of Silicon and 86 percentage by weight of water. After the application of the glass-wool fibres on the outside of the cavity the layer is formed and compressed against surfaces having insignificant adhesiveness, for example having a coating of PTFE (Polytetraflouroethylene). Then, the water contained in the layer has to be removed for the silicate binder to harden. This drying process can take place in a convection oven at temperatures below 600° C. or by means of infrared radiation elements. Finally, an acetate-based binder can be applied to the insulating layer in order to prevent or substantially limit the creation of dust during the handling of the oven cavity and, in addition, to improve the mechanical strength of the layer. Alternatively, the application can take place prior to drying if the drying temperatures do not exceed about 200° C. An example of such binder is National ML 7224 which can to be applied as an aqueous solution.

The following description will be concentrated on those parts of the application process concerned with the transfer of fibres from a store to an application nozzle and to the application itself of the fibres to the surface of the oven cavity via said nozzle. However, the subsequent forming and surface treatment of the insulating layer thus applied will not be discussed in detail.

In FIG. 1 an insulation spraying station is shown in which an insulating layer of the kind referred to can be applied to the outside of an oven cavity 10. The station is built up around a handling robot 11 which collects an oven cavity from a collecting station 12 and brings it to a work station 13 where the application, is to take place. After the application the robot moves the cavity to another collecting station 14 for further transport within the production establishment.

The fibre to be applied to the even cavity is obtained from a fibre tearing machine 15 of conventional type. A fibre bale 16 is inserted in the machine to be fed by a feeding means 17 towards rollers 18, 19 of a shape so as to convert the bale into a stream of fibre bundles which, by means of air, are blown towards the inlet of a hose 20 the outlet end of which opens into an application nozzle 21. In FIG. 1 there are also shown two ejectors, one of which, designated 22, is disposed at the inlet of the hose and another one, designated 23, is disposed at the outlet end of the hose. The function of the ejectors will be described more in detail in the following.

The application nozzle 21 emits a stream of fibres which is directed towards the oven cavity. In order for the fibres to stick to the surface of said cavity the fibres are wetted with liquid from nozzles 24 disposed around the outlet opening of said nozzle. The liquid is provided from a liquid system comprising a container 25 and a pump 26. As indicated above, the liquid consists of a silicate binder and water. To prevent sedimentation when the nozzle is not operating, the liquid is circulated in the system and, in addition, a stirrer 27 is provided in the container 25 which is activated during the circulation process. A pumping device can also be used which continuously adds water.

During the application, the robot 11 is arranged to move the different sides of the cavity past the application nozzle, which is fixed. In doing so, a gripping tool of the robot performs the different movements in synchronism with the way of working of the nozzle so that layers of a predetermined thickness are applied to the sides of the cavity. The application process is controlled by a control unit 28 programmed to perform a number of different programs to be selected by a keyboard 29 or the like. Further, the station contains a hydraulic pump 30 which operates the fibre tearing machine 15 and a unit 31 comprising valves and regulators for air and liquid to the ejectors 22 and 23 and to the liquid nozzles 24, respectively.

Subsequent to the application, the humid loose fibre layer on the sides of the cavity has to be formed or compressed which takes place in a forming station 32 where forming parts coated with PTFE are brought into contact with said sides. After the forming, the insulating layer has to be dryed in a drying staton 32a which, as already mentioned, comprises a convection oven or infrared radiation elements. However, spraying equipment 33 is shown by means of which an additional cooling is applied to the formed and dryed insulating layer. As mentioned above, the purpose of this coating is to prevent dust emission from the insulating layer and in addition the layer is given a higher mechanical strength.

Figure 2:
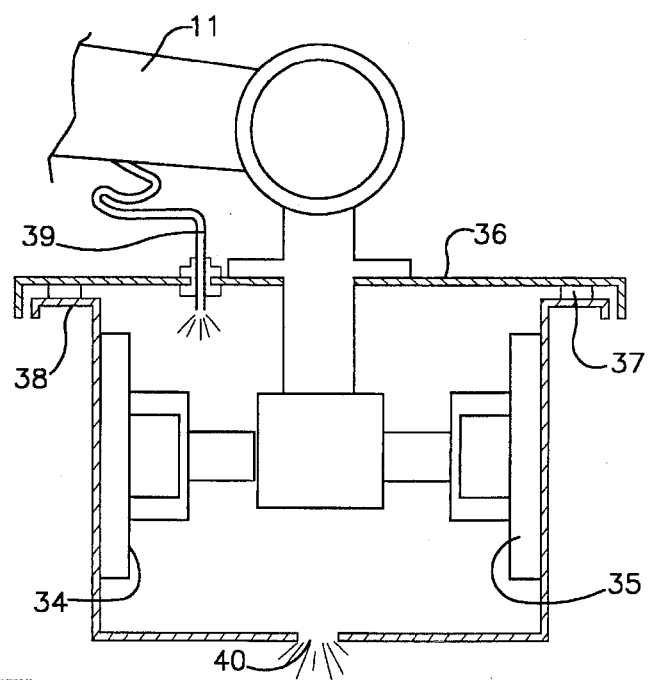
FIG. 2 schematically shows the oven cavity supported by the gripping tool of a handling robot in the production facility.

During the application of the insulating layer to the external surfaces of the oven cavity, to a certain extent glass fibres will find their way into said cavity and stick to the interior surfaces of the cavity. To prevent this the gripping tool of the robot 11 has been designed as shown in FIG. 2. The cavity is held by the gripping tool by two parts 34, 35 pressing against two opposite surfaces inside of the cavity, and the open end of the cavity is closed by a wall 36 which, via an intermediate sealing gasket 37, bears against a flange 38 surrounding the open end of the cavity. By a conduit 39 a gas, suitably air, is introduced into the cavity to create an overpressure which prevents fibres and binder from entering through remaining minor openings for details to be mounted, such as the opening 40 in the rear wall of the cavity.

Figure 3:
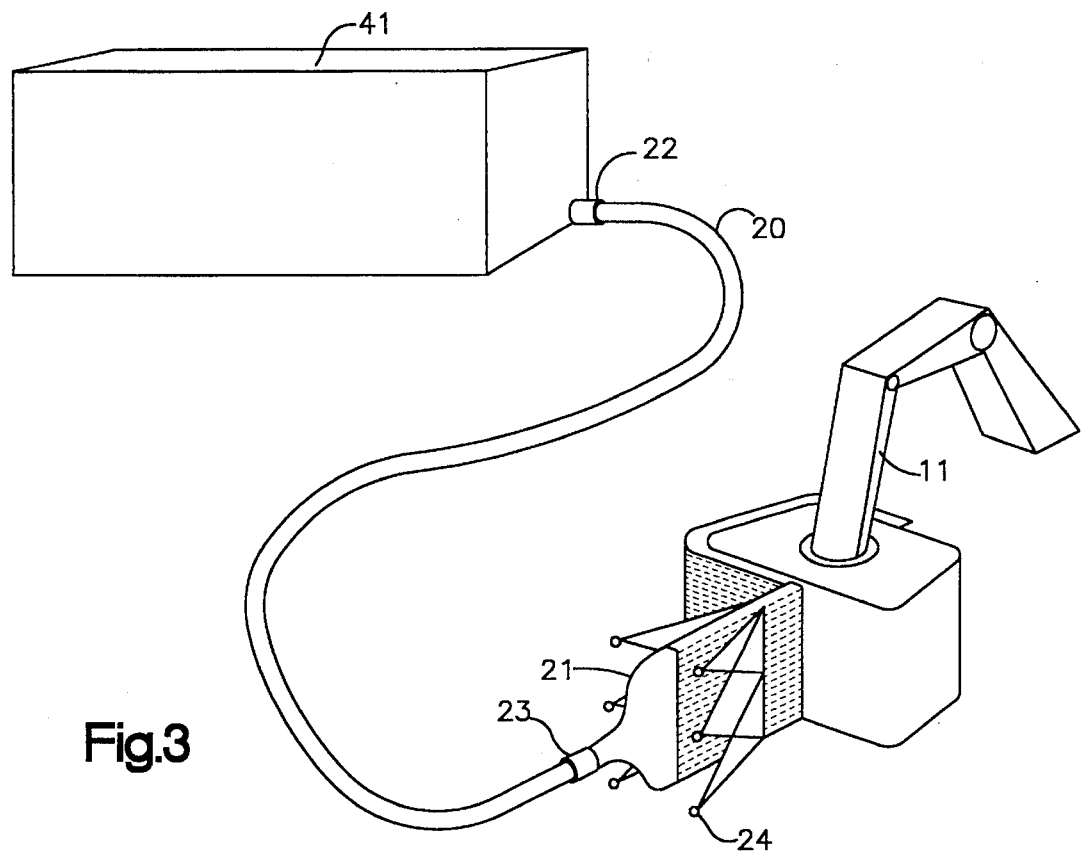
FIG. 3 schematically shows a device for applying an insulating layer, the device being part of the facility of FIG. 1.
Figures 4A, 4B:
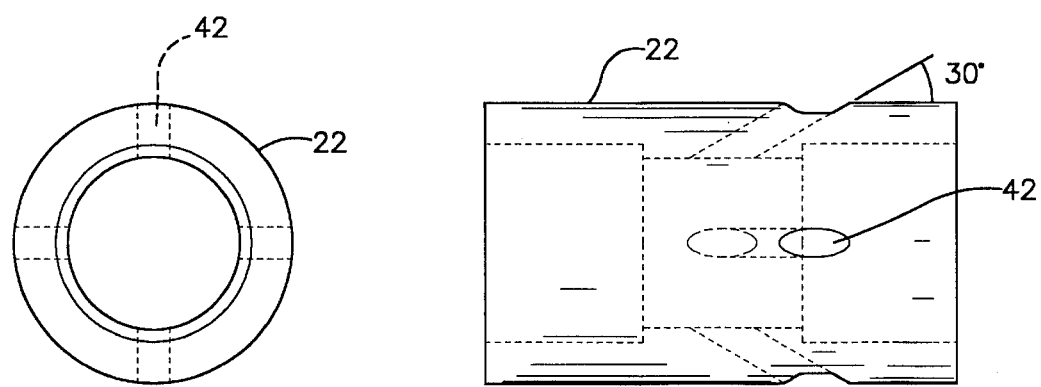
FIG. 4a and 4b show an ejector, being part of the device of FIG. 2, for providing of a unidirectional air stream.

With reference to FIG. 3 the device for applying the insulating layer to the external sides of the cavity will now be described. Glass fibres are avaliable in a store 41 and, principle, these fibres can be delivered in finely divided form. In the embodiment illustrated the store is part of the fibre tearing machine shown in FIG. 1 and glass fibres for the machine are delivered in the form of compressed fibre bales. In the way described, the machine operates to tear the fibre bale into small fibre bundles which by means of air are blown into the conduit 20 to create in this conduit a fibre stream mixed with air. The means for generating said air stream is labbelled 30a in the figure. In order to facilitate the blowing of the fibres into the conduit air jets are introduced in the ejector 22 from different sides so that a vacuum is established for sucking for the fibres into said conduit and so that additional air is introduced into the conduit for the transport of fibres through same. In FIGS. 4a and 4b an embodiment of the ejector is shown in which four bores 42 open in an area of reduced cross-section, said bores being disposed crosswise. The bores extend in the direction of the fibre stream through the ejector but intersects this direction at an angle of about 30 degrees. The number of bores can be increased and in a modified embodiment, hoe shown, said number has been doubled and the bores have been evenly distributed along the periphery. A number of such modifications can be made within the scope of invention.

Figure 5A:
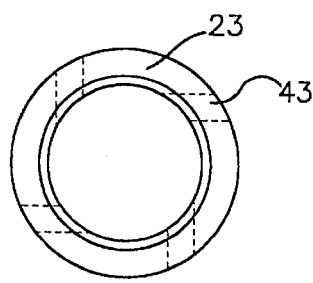
FIG. 5a and 5b show an ejector, being part of the device of FIG. 2, for creating a rotating movement of an air stream containing fibres.
Figure 5B:
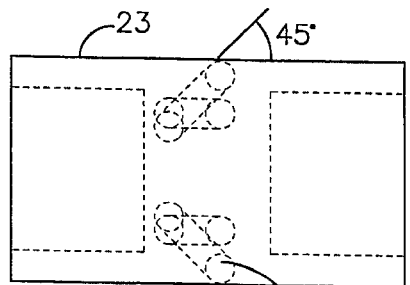

As appears from FIGS. 1 and 3, between the conduit 20 and the application nozzle 21 an additional ejector is provided for the purpose of creating a suitably shaped fibre stream leaving the nozzle. The nozzle has an outlet opening which is mainly rectangular in order that the insulating layer applied be given the shape of a swath of a corresponding rectangular cross-section. Therefore, the object is to distribute the fibre flow evenly along the whole of the outlet opening and, accordingly, the ejector 23 is designed so as to apply a rotational movement of sufficient magnitude to the fibre stream in the conduit. In FIGS. 5a and 5b an embodiment is shown in which, as in the ejector 22, four bores 43 open inside the injector in an area of reduced diameter. Here, the bores are directed tangentially to the circular inner wall of the ejector but also at an angle with respect to the direction of the fibre stream through the ejector, said angle, preferably, being at about 45 degrees. As in the ejector 22 the number of bores can be varied as well as the disposition of same without departing from the scope of invention. For example, a modified embodiment, not shown, has been tested in which eight bores have beech evenly distributed along the periphery of the ejector. The ejectors 22 and 23 also contribute in additionally reducing the size of the fibre bundles leaving the fibre tearing machine.

Figures 6, 7, 8:
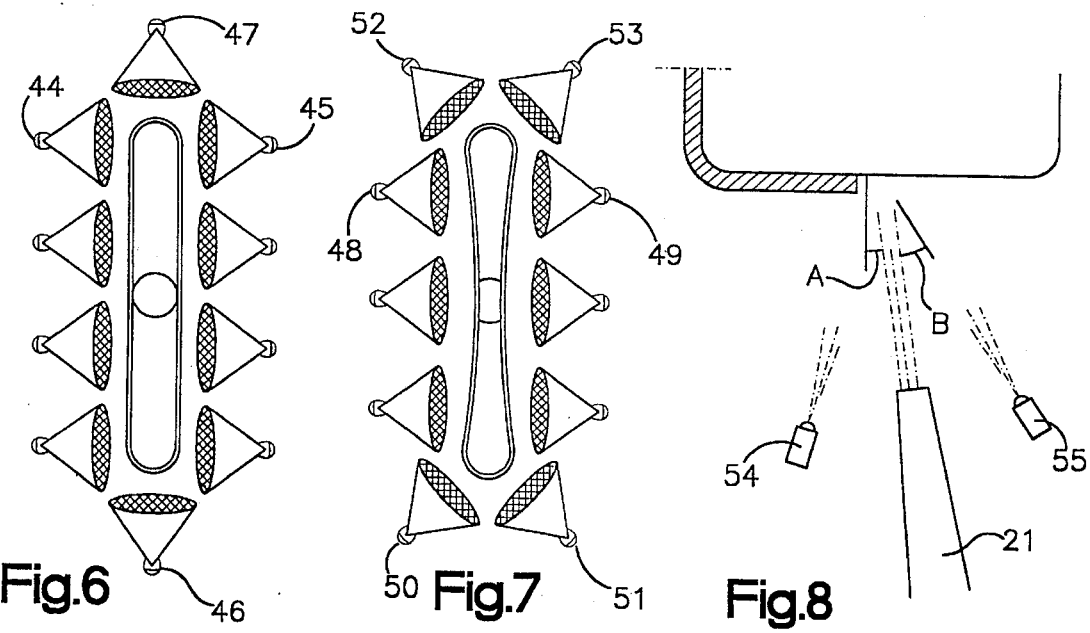
FIG. 6 is a schematic view taken perpendicular to the outlet of a fibre applying nozzle, being part of the device of FIG. 2, showing a preferred arrangement of liquid spraying nozzles.
FIG. 7 shows a modified embodiment of the arrangement of FIG. 6.
FIG. 8 schematically shows, in a top view, the fibre applying and liquid spraying nozzles, respectively, described with reference to FIGS. 5 and 6.

When, by means of the ejector 23, the fibre stream from the nozzle 21 has been given a suitable shape another problem arises, namely the problem of wetting in a correct way the outflowing fibres so that they stick to the surface to be coated. To that end, a number of liquid nozzles 24 have been disposed adjacent to the rectangular nozzle opening so that the two rectangular sides of the fibre stream can be wetted as evenly as possible. In FIG. 3 two rows of three nozzles each have been arranged vertically along the sides of the nozzle. The jets from the nozzles overlap so that complete coverage is achieved. Modified embodiments are shown in FIGS. 6 and 7. In FIG. 6 four liquid nozzles 44 and 45, respectively, have been arranged at each side of the application nozzle 21 to form vertical rows whereas at the bottom and at the top liquid nozzles 46 and 47, respectively, have been disposed so that the corresponding jets are directed upwards and downwards, respectively, to prevent fibre losses in these directions. In the embodiment according to FIG. 7, at both sides of the outlet opening of the application nozzle three liquid nozzles each, 48 and 49, respectively, form vertical rows while at the bottom two liquid nozzles 50 and 51 and at the top corresponding liquid nozzles 52 and 53 are provided. The nozzles 50, 51, 52 and 53 are directed at an angle to the fibre stream giving a good wetting of the corresponding parts of the fibre stream in addition to their preventing fibre of losses. In this embodiment, the peripheral parts of the application nozzle have a greater cross-section than the central parts adjacent to the inlet opening of the nozzle. The embodiments according to FIGS. 6 and 7 both have shown to result in a good distribution of the fibre flow in the nozzle opening at the same time as the wetting is good and the fibre loss is insignificant.

In order to improve the adhesion of fibre to the surface of the oven cavity it is an advantage if said surface be wetted with the mixture of water and binder prior to being hit by the wetted fibres. In FIG. 8 two liquid nozzles 54, 55 are disposed at each side of the application nozzle 21. The nozzle 55 forms with the fibre stream an angle B which is smaller than the corresponding angle for the nozzle 54 wherein part of the liquid jet hits the part of the oven cavity about to be hit by the fibre stream. The angle B is optimized so that wetting of the surface takes place without negatively influencing the wetting of the fibre stream. As appears from the figure another angle A has been drawn to indicate a certain inclination of the direction of the fibre stream from said nozzle with respect to the normal to the surface of the oven cavity. The purpose of this inclination is to minimize the fibre loss during application.

Figures 9A, 9B:
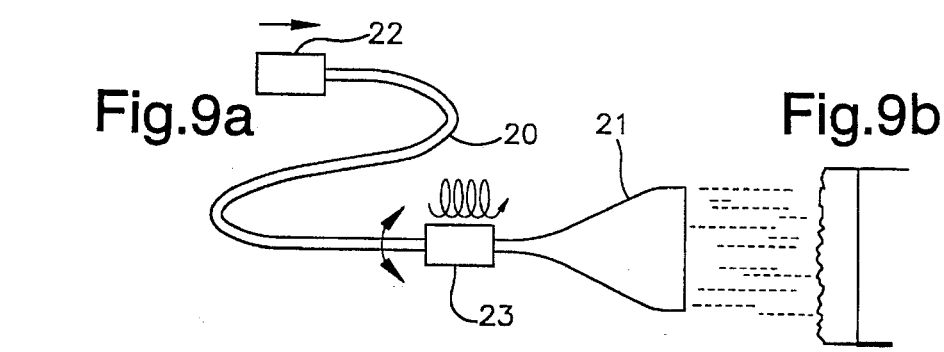
FIGS. 9a–9g schematically show the distribution of fibres applied onto an object at different modes of operation with different parameters set which influence the fibre stream.
Figure 9C:
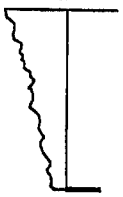
Figure 9D:
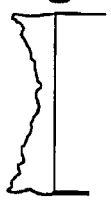
Figure 9E:
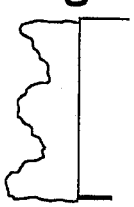
Figure 9F:
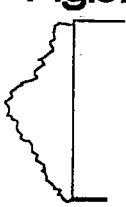
Figure 9G:

In connection with the embodiments shown in the drawings it has been shown that a good result is dependent on a number of parameters being optimized correctly. In FIG. 9a another such parameter is shown, namely the inclination of the conduit 20 vertically at the passage to the ejector 23. Tilting of the conduit upwards causes an increase of the amount of fibre at the lower part of the application nozzle whereas tilting of the conduit downwards gives the opposite effect. In FIG. 9b an even coverage of the surface is obtained which can be expected at the optimal setting of the various parameters, such as air quantity and the directions in the ejectors, the inclination of the conduit mentioned, the design of the application nozzle and the positioning of the liquid nozzles and the flow charateristics of same. In FIG. 9c an uneven distribution is achieved due to incorrect inclination of the conduit to the ejector 23. Here, the conduit is too high, that is the conduit leans downwards towards the ejector. In case FIG. 9d too small quantity of fibre is present at the centre possibly due to too much air in the rotational ejector 23 or insufficient quantity of air in the ejector 22. In FIG. 9e the fibres are concentrated in the centre, at the top and at the bottom which could be caused by too much air both in the rotational ejector 23 and in the ejector 22. In FIG. 9f a concentration of fibres in the center is illustrated possibly due to an insufficient amount of air to the rotational ejector 23. In FIG. 9g there is shown the distribution resulting from both ejectors 22 and 23 being left out. The flow is instable and a fibre concentration is achieved at the surface.

We claim:

1. A device for applying insulation to a surface of an object (10), said device comprising a store (15) of fibres of an inorganic material, a spray nozzle (21) having an elongated output area a conduit means (20) connected between said store and said spray nozzle for transferring the fibres from the store (15) to the spray nozzle (21), means (30a) in fluid communication with said store for blowing fibres from the store into the conduit means and for generating an air flow in the conduit means (20) directed towards the nozzle, first ejector means (22) provided at an end of the conduit means adjacent the store (15) for introducing air jets into said conduit means (20) in the direction of a fibre stream so as to apply a drawing effect on fibres adjacent to a conduit inlet, second ejector means (23) disposed at the end of the conduit means adjacent the spray nozzle (21) for the introduction of air jets directed so as to bring the fibre stream into rotation, means in fluid communication with said first and second ejector means for supplying air to said first and second ejector means, and means (24;44–47; 48–53) disposed adjacent to the spray nozzle (21) for introducing liquid jets comprising a mixture of water and a binder into the fibre stream outside of the spray nozzle, said liquid jets being introduced in the direction of the fibre stream but forming an angle with said stream.

2. A device according to claim 1, wherein the first ejector means (22) comprises a plurality of nozzles (42) distributed along a periphery of the conduit means, said nozzles being directed so that the air jets from said nozzles form an angle with a passing fibre stream of about 30 degrees.

3. A device according to claim 2, wherein eight nozzles (22) are provided, said nozzle being evenly distributed.

4. A device according to claim 1, wherein the second ejector means (23) comprises at least four nozzles (43) disposed crosswise and being directed so as to have the air jets from said nozzles tangentially enter the conduit means (20) and form an angle of about 45 degrees with a passing fibre stream.

5. A device according to claim 4, wherein said spray nozzle has a pair of longer sides and a pair of shorter sides, a plurality of liquid nozzles (24;44,45;48,49) being disposed in a row along both of the longer sides of the spray nozzle (21).

6. A device according to claim 5, wherein at least one of the liquid nozzles is provided adjacent one of the shorter sides of the spray nozzle (21).

7. A device according to claim 5, wherein at least one of said liquid nozzles (46,47;50–53) is provided adjacent each of the shorter sides of the spray nozzle.

8. A device according to claim 5, further comprising an other liquid nozzle (55) adjacent said spray nozzle, said other liquid nozzle (55) being directed so that a liquid jet issuing from said other nozzle (55) wets the surface of said object prior to the application of the fibres.

9. A device according to claim 4, wherein the conduit means (20) is connected to the spray nozzle (21) and an outlet direction of the fibre stream is set within a range limited by shorter sides of an outlet opening of the nozzle.

10. A device according to claim 1, wherein the spray nozzle (21) has a cylindrical inlet part and an outlet part which is mainly rectangular, a shorter side of the outlet part being mainly of the same size as a diameter of said inlet part of the nozzle whereas a longer side of the outlet part has a size which is considerably greater than the inlet part diameter.

11. A device according to any one of claims 7, wherein means (11) adjacent to said spray nozzle are provided to move the surface of the object (10) past the spray nozzle (21), said nozzle being directed so that the fibre stream from said nozzle hits the object surface (10) at an angle to the direction of movement of said object which is greater than 90°.

12. A device according to claim 1, wherein the binder is a silicate-based binder.

13. A device according to claim 1, comprising means (32)

for forming a wetted fibre layer applied to the object (10) and means for subsequently drying the formed layer.

14. A device according to claim 1, wherein the conduit means is tiltably connected to the nozzle to allow the direction of fibre flow from the conduit means into the nozzle to be adjustable.

15. A device for applying insulation to a surface of an object as recited in claim 1, further comprising means adjacent said spray nozzle for transporting and holding said object.

16. A device for applying insulation to a surface of an object as recited in claim 15, wherein said means for transporting and holding said object comprise a robotic arm, said arm including a gripping tool which engages a surface of said object and thereby supports said object.

17. A device for applying insulation to a surface of an object as recited in claim 16, wherein said means for transporting and holding said object includes means for pressurizing an interior of said object.

\* \* \* \* \*

UNITED STATES PATENT AND TRADEMARK OFFICE
CERTIFICATE OF CORRECTION

PATENT NO. : 5,507,869
DATED : April 16, 1996
INVENTOR(S) : Nyberg et al.

It is certified that error appears in the above-indentified patent and that said Letters Patent is hereby corrected as shown below:

On the face of the patent, in the abstract, line 2, delete "an", and insert --are--.

Column 1, line 9, after "ovens" insert --.-- (comma);
         line 9, after "oven" delete --,-- (comma);
         line 9, delete "a heat cavity" and insert --heat--;
         line 11, after "oven" insert --cavity--;
         line 13, after "parts" insert --do--;
         line 26, delete "air In" and insert --air, In--; and
         line 53, delete "more in" and insert --in greater--.

Column 2, line 31, delete "is" and insert --are--; and
         line 52, delete "to".

Column 3, line 3, delete "even" and insert --oven--; and
         line 48, delete "cooling" and insert --coating--.

Column 4, line 3, after "and," insert --in--;
         line 12, delete "labbelled" and insert --labelled--;
         line 23, delete "hoe" and insert --not--; and
         line 47, delete "beech" and insert --beeen--.

In the Abstract, line 2 "fibers," should read --,fibers--

UNITED STATES PATENT AND TRADEMARK OFFICE
CERTIFICATE OF CORRECTION

PATENT NO. : 5,507,869
DATED : April 16, 1996
INVENTOR(S) : Nyberg et al.

It is certified that error appears in the above-indentified patent and that said Letters Patent is hereby corrected as shown below:

Column 5, line 9, delete "fibre of" and insert  -- fibre --; and
line 49, delete "case".

Column 6, line 24 (claim 3, line 2), delete "nozzle" and insert -- nozzles --;
line 58, (claim 11, line 1), delete "7" and insert --5, 6, 7 and 10--.

Signed and Sealed this

Twenty-second Day of October, 1996

Attest:

BRUCE LEHMAN

*Attesting Officer*     *Commissioner of Patents and Trademarks*